United States Patent
Nishihara et al.

(10) Patent No.: US 9,872,431 B2
(45) Date of Patent: *Jan. 23, 2018

(54) WIND-GENERATING MOWER BLADE

(71) Applicant: Kubota Corporation, Osaka (JP)

(72) Inventors: Hironobu Nishihara, Sakai (JP); Masayuki Akita, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/070,140

(22) Filed: Mar. 15, 2016

(65) Prior Publication Data

US 2016/0192586 A1    Jul. 7, 2016

Related U.S. Application Data

(63) Continuation of application No. 14/192,347, filed on Feb. 27, 2014, now Pat. No. 9,307,695.

(30) Foreign Application Priority Data

Sep. 20, 2013 (JP) .................................. 2013-195794

(51) Int. Cl.

| | |
|---|---|
| *A01D 34/00* | (2006.01) |
| *A01D 34/63* | (2006.01) |
| *A01D 34/73* | (2006.01) |
| *A01D 34/66* | (2006.01) |
| *A01D 34/82* | (2006.01) |
| *A01D 101/00* | (2006.01) |

(52) U.S. Cl.
CPC ......... *A01D 34/664* (2013.01); *A01D 34/005* (2013.01); *A01D 34/63* (2013.01); *A01D 34/73* (2013.01); *A01D 34/826* (2013.01); *A01D 2101/00* (2013.01)

(58) Field of Classification Search
CPC combination set(s) only.
See application file for complete search history.

(56) References Cited

U.S. PATENT DOCUMENTS

| | | | |
|---|---|---|---|
| 2,924,058 A | | 2/1960 | Brooks |
| 3,242,660 A | * | 3/1966 | Gary .................... A01D 42/005 15/339 |

(Continued)

FOREIGN PATENT DOCUMENTS

| | | |
|---|---|---|
| AU | 510043 B2 | 6/1980 |
| DE | 29511639 U1 | 1/1997 |

(Continued)

*Primary Examiner* — Alicia Torres
(74) *Attorney, Agent, or Firm* — The Webb Law Firm

(57) ABSTRACT

A cutter blade for a mower is driven to rotate about a vertical axis inside a housing. The cutter blade includes a blade body, a blade portion formed in the blade body and a wind generating portion formed in the blade body on its side opposite in a width direction thereof to the side where the blade portion is formed, the wind generating portion being formed by being raised and bent from the blade body over a predetermined area from an end in a longitudinal direction thereof. At an outer end portion of the wind generating portion in the longitudinal direction of the blade body, there is formed at least one recessed portion recessed more inwards than the remaining portion of the outer end portion.

9 Claims, 6 Drawing Sheets

(56) References Cited

U.S. PATENT DOCUMENTS

| | | | |
|---|---|---|---|
| 3,482,380 A * | 12/1969 | Stair | A01D 34/736 144/34.1 |
| 3,998,037 A | 12/1976 | Deans et al. | |
| 5,197,268 A | 3/1993 | Barrera | |
| 5,321,940 A * | 6/1994 | Peterson | A01D 34/73 56/255 |
| 5,899,053 A | 5/1999 | Roth | |
| 6,487,840 B1 | 12/2002 | Turner et al. | |
| 7,124,566 B2 | 10/2006 | Treger et al. | |
| 2002/0152736 A1 | 10/2002 | Hasei et al. | |
| 2006/0042216 A1 * | 3/2006 | Warashina | A01D 34/005 56/255 |

FOREIGN PATENT DOCUMENTS

| | | |
|---|---|---|
| JP | 2002315418 A | 10/2002 |
| JP | 2005312396 A | 11/2005 |

* cited by examiner

WIND-GENERATING MOWER BLADE

CROSS REFERENCE TO RELATED APPLICATIONS

This application is a continuation of U.S. patent application Ser. No. 14/192,347 filed on Feb. 27, 2014, which claims priority to Japanese Patent Application No. 2013-195794 filed Sep. 20, 2013, the disclosures of which are hereby incorporated in their entirety by reference.

BACKGROUND OF THE INVENTION

Field of the Invention

The present invention relates to a cutter blade for a mower which is driven to rotate about a vertical axis inside a housing.

Description of Related Art

The cutter blade described above generates a wind inside a housing by a wind generating portion, so that this wind raises grass for facilitating its cutting or conveying cut grass. Incidentally, by enlarging the wind generating portion, it is possible to increase the amount of wind generated for enhancement of the ability to raise grass or to covey cut grass. On the other hand, with this type of cutter blade, a negative pressure can sometimes be generated on the back side of the wind generating portion (on the rear side relative to the rotational direction of the cutter blade). And, generation of such negative pressure leads to generation of vortex at this negative pressure portion, which in turn tends to invite increase of noise. Conventionally, as an arrangement for preventing generation of a negative pressure on the back side of the wind generating portion, there are known cutter blades disclosed in e.g. Japanese Unexamined Patent Application Publication No. 2002-315418 and Japanese Unexamined Patent Application Publication No. 2005-312396. More particularly, Japanese Unexamined Patent Application Publication No. 2002-315418 and Japanese Unexamined Patent Application Publication No. 2005-312396 disclose cutter blades, wherein a hole portion is provided at the wind generating portion for establishing communication between the front side of this wind generating portion (the front side relative to the rotational direction of the cutter blade) and the back side of the same. With these cutter blades, it is contemplated to enlarge the wind generating portion by allowing air communication from the front side to the back side of the wind generating portion via the hole portion formed in this wind generating portion and to eliminate the noise associated with a negative pressure at the same time.

However, with the cutter blades disclosed in Japanese Unexamined Patent Application Publication No. 2002-315418 and Japanese Unexamined Patent Application Publication No. 2005-312396, the hole portion can sometimes be clogged up with cut grass during use of the cutter blade. With occurrence of such clogging of the hole portion with cut grass, the communication of air from the front side to the back side of the wind generating portion is hindered, so that negative pressure cannot be avoided sufficiently, thus failing to achieve the expected noise prevention effect. In view of the above-described, there is a need for a cutter blade capable of reducing noise with maintaining the wind generation function by its wind generating portion.

SUMMARY OF THE INVENTION

A cutter blade for a mower, according to the present invention, comprises: a blade body; a blade portion formed in the blade body; and a wind generating portion formed in the blade body on its side opposite in a width direction thereof to the side where the blade portion is formed, the wind generating portion being formed by being raised and bent from the blade body over a predetermined area from an end in a longitudinal direction thereof; wherein at an outer end portion of the wind generating portion in the longitudinal direction of the blade body, there is formed at least one recessed portion recessed more inwards than the remaining portion of the outer end portion.

With the above-described arrangement, an amount of air is supplied via the recessed portion to the back side of the wind generating portion, so that generation of a negative pressure can be prevented. Further, as this recessed portion is open to the side of the outer end portion of the wind generating portion, it is also possible to prevent clogging with cut grass. For this reason, even when a grass cutting operation is carried out continuously, air can be supplied to the back side of the wind generating portion, so that generation of negative pressure can be prevented continuously. Further, as the recessed portion is formed at the outer end portion of the wind generating portion, this recessed portion is formed at the outer circumferential edge of the mower blade having the highest circumferential speed, thus tending to invite generation of a negative pressure. Therefore, it is possible to supply air to the negative pressure portion in an effective manner. As a result, even when a grass cutting operation is continued, noise can be prevented effectively. Thus, even when the wind generating portion is formed, relatively large, noise prevention will still be possible. Accordingly, it is possible to reduce noise generation with maintaining the wind generating function of the wind generating portion at the same time.

In the above-described arrangement, preferably, the recessed portion is formed at a portion of the outer end portion excluding a boundary area from an upper end portion of the wind generating portion.

In the above-described arrangement, preferably, the recessed portion is not formed at a boundary area in the upper end portion from the upper end portion of the wind generating portion. With this arrangement, the recessed portion is not existent at the boundary area of the wind generating portion which portion is most distant from the rotational center of the cutter blade. Therefore, it becomes possible to increase the rotational circumferential speed of the wind generating portion, so that its wind generating function can be maintained reliably.

In the above-described arrangement, preferably, a plurality of said recessed portions are provided; and the recessed portions and protruding portions constituting areas between adjacent recessed portions are continuous with each other via a curved line as seen in a front view. With this, the recessed portions and the protruding portions are formed smoothly continuous with each other via the curved line, so that stress concentration at the recessed portions can be prevented and the durability of the cutter blade can be enhanced.

In the above-described arrangement, preferably, as seen in the front view, the recessed portion has a curved shape and a curvature of the recessed portion is set greater than a plate thickness of a plate member forming the cutter blade. With this arrangement, the curvature of the recessed portion is made relatively large, thus facilitating formation of this recessed portion.

In the above-described arrangement, preferably, the recessed portion is formed at a position in the outer end portion corresponding to a boundary portion between the blade body and a raised portion of the wind generating portion.

In the above-described arrangement, preferably, at the upper end portion of the wind generating portion, there is formed at least one recessed portion which is recessed more downward than the remaining portion of the upper end portion.

BRIEF DESCRIPTION OF THE DRAWING(S)

DESCRIPTION OF THE INVENTION

Next, embodiments of the present invention will be explained with reference to the accompanying drawings.

Figure 1:
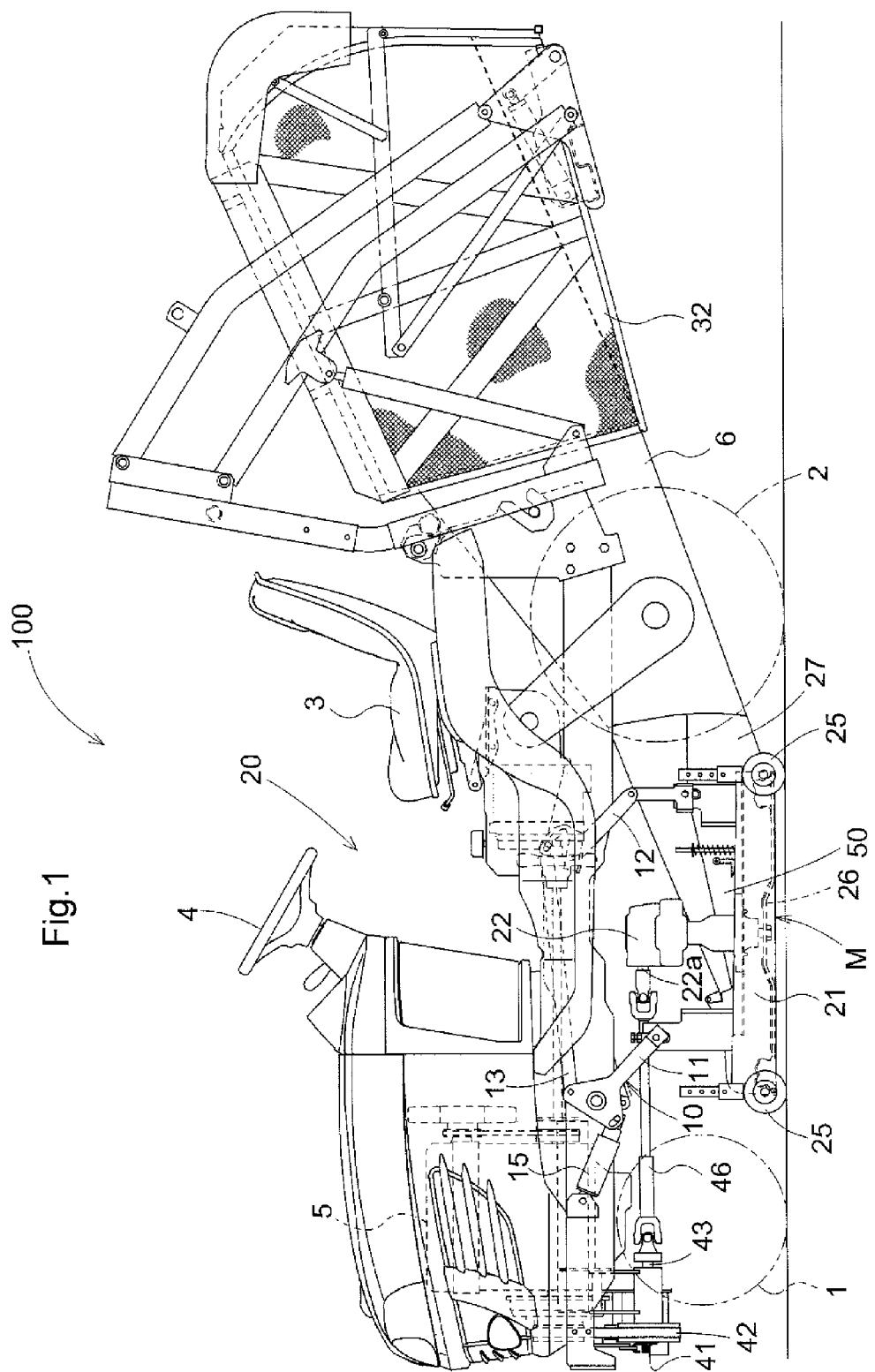
FIG. 1 is a view showing an example of a riding type mower to which the mower cutter blade of the present invention is applicable.

FIG. 1 is a whole side view showing a riding type mower 100 mounting a mower M. As shown in this figure, this riding mower 100 includes a traveling vehicle body 20 supported on a pair of left and right steerable front wheels 1, 1 and a pair of left and right drivable rear wheels 2, 2. This traveling vehicle body 20 mounts a driver's seat 3 at which a rider is to be seated, a steering wheel 4 for steering the front wheels 1, 1, etc. Further, at a front portion of the traveling vehicle body 20, an engine 5 is mounted. Under this traveling vehicle body 20 and between the front wheels 1, 1 and the rear wheels 2, 2, the mower M is provided. The mower M is supported to be lifted up/down relative to the traveling vehicle body 20 via a link mechanism 10. At a rear portion of the traveling vehicle body, a grass collector container 32 is supported.

Figure 2:
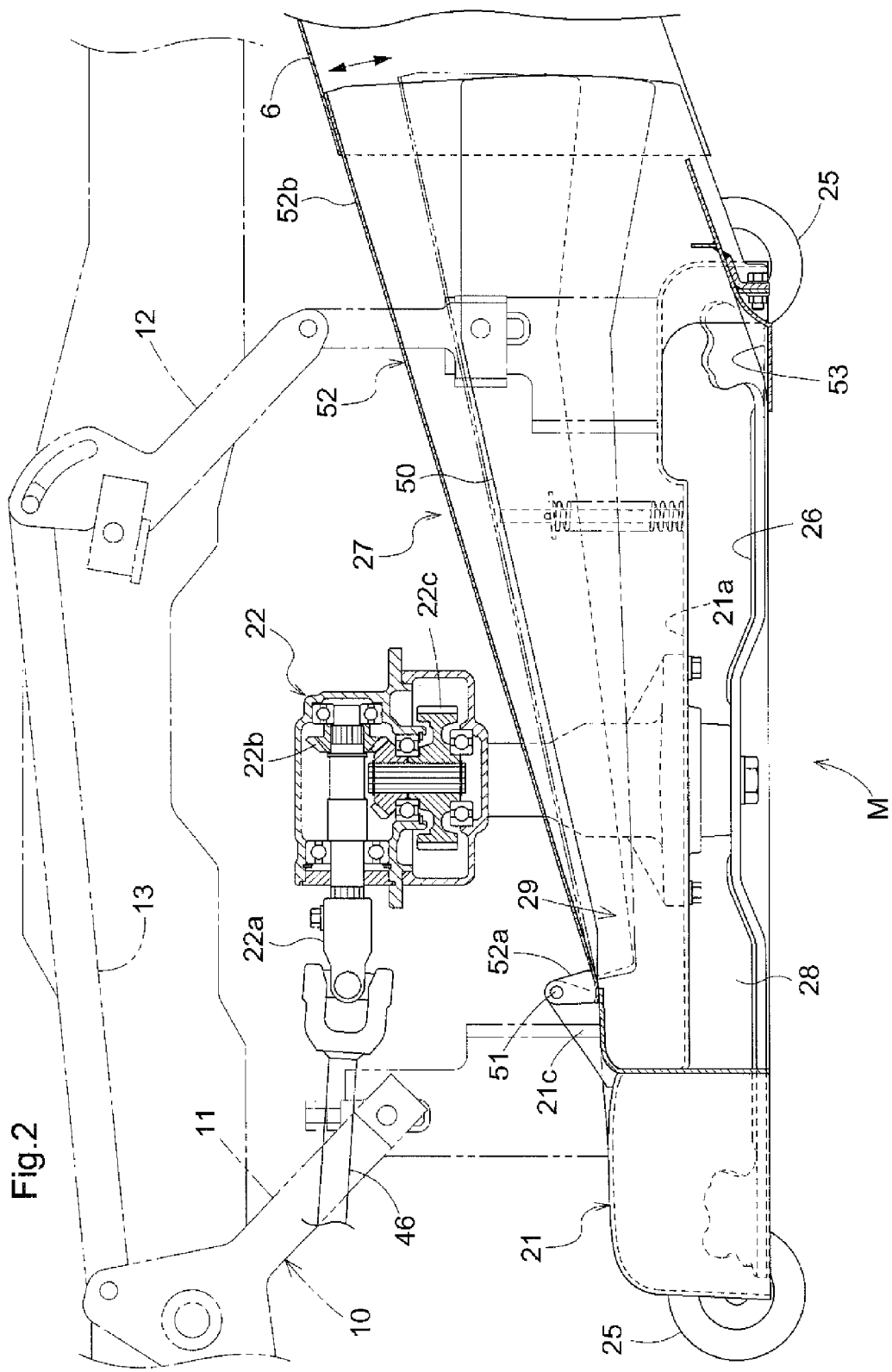
FIG. 2 is a partial vertical cross section of the mower.

As shown in FIG. 1 and FIG. 2, downwardly of the engine 5, there is provided a power take-off shaft (PTO) shaft 43 for taking power off the engine 5. The output of the engine 5 is inputted to an input shaft 41 via a transmission belt 42, and a driving power of the PTO shaft 43 transmitted to the output end of the input shaft 41 is transmitted to a cutter blade driving mechanism 22 for the mower M via a rotational shaft 46.

The link mechanism 10 includes a pair of left and right front pivot links 11, 11 supported vertically pivotally to the traveling vehicle body 20, a pair of left and right rear pivot links 12, 12 supported vertically pivotally to the traveling vehicle body 20, and a pair of left and right coupling links 13, 13. A lift cylinder 15 is operably coupled to one of the pair of the left and right front pivot links 11, 11. In association with expansion/contraction of the lift cylinder 15, the pivot link 11 is pivotally operated. As a result, the mower M is lifted up/down between a lowered working state in which ground-contacting gauge wheels 25 supported to front and rear sides of the mower housing 21 are placed in contact with the ground surface and a raised non-working state in which the respective ground-contacting gauge wheels 35 are lifted off the ground surface.

Next, an explanation of the mower M will be given with reference to the drawings.

Figure 3:
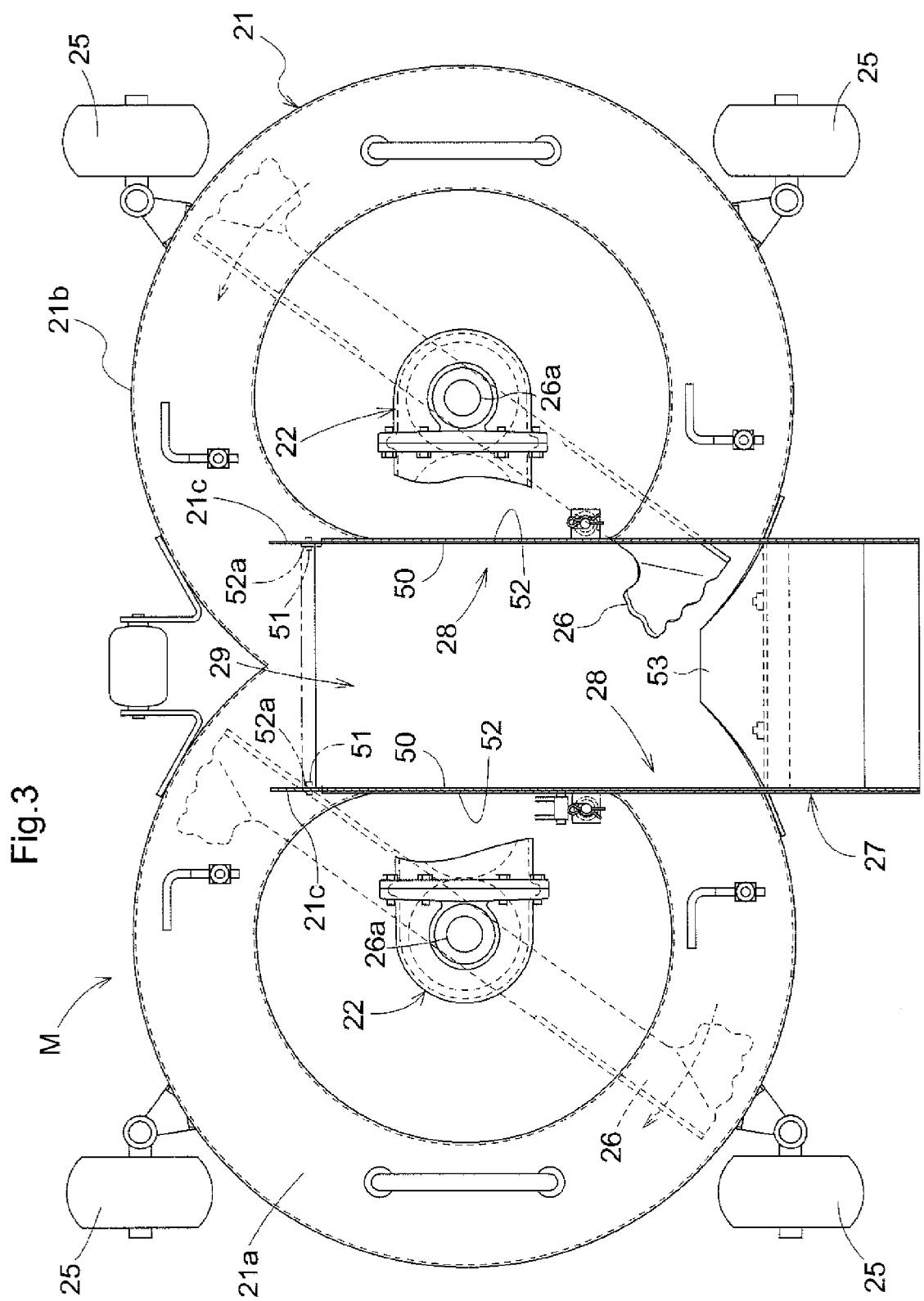
FIG. 3 is a partial cross section of the mower.

As shown in FIG. 2 and FIG. 3, the mower housing 21 includes a pair of mowing chambers 28, 28 formed side by side in the right/left lateral direction inside the mower housing 21 by a top plate 21a and side plates 21b formed continuously from the peripheral edge of this top plate 21a and a cut-grass discharge opening 29 formed by providing a cutout hole in the top plate 21a.

The pair of mowing chambers 28, 28 are open to the ground surface on the side of the lower end of the mower housing 21 and are disposed adjacent and communicated to each other at a position located at the center in the lateral width direction of the mower housing 21. The cut-grass discharge opening 29 is located at a position upwardly of the portion where the pair of mowing chambers 28, 28 are adjacent to each other and is communicated to each cutting mowing chamber 28.

Two cutter blades 26, 26 are provided, with one of them being disposed in each mowing chamber 28. The cutter blade 26 is supported to a rotational support shaft 26a to be rotatable therewith, the rotational support shaft 26a extending through the top plate 21a of the mower housing 21 and the cutter blade 26 is driven by a cutter blade driving mechanism 22 to be rotated about a vertical axis provided in the rotational support shaft 26a. And, the cutter blade driving mechanism 22 transmits a driving force of an input shaft 22a operably coupled to the rotational shaft 46, with using a bevel gear 22b and a spur gear 22c.

A cut-grass discharge duct 27 includes duct lower structures 50 formed by adding metal plates to opposed lateral sides of the cut-grass discharge opening 29 in the mower housing 21 and duct upper structures 52 having coupling portions 52a continuously connected to a pair of left and right support portions 21c, 21c provided at the front end portion of the mower housing 21 via pivot pins 51. The pair of left and right duct lower structures 50, 50 include a rear guide plate 53 connected to and between lower portions of the rear ends of these duct lower structures 50, 50.

Regarding the cut-grass discharge duct 27, the lower portion of the side plate on the left or right side of this cut-grass discharge duct 27 is formed by the pair of left and lower duct lower structures 50, 50, and the duct upper structures 52 of the left and right side plates of the cut-grass discharge duct 27 and the top plate 52b, and in operation, an amount of cut grass is conveyed in the form of a flow by the duct lower structures 50 and the duct upper structures 52 toward the rear upper side of the mower housing 21 to be fed to a conveyer duct 6.

Figure 4:
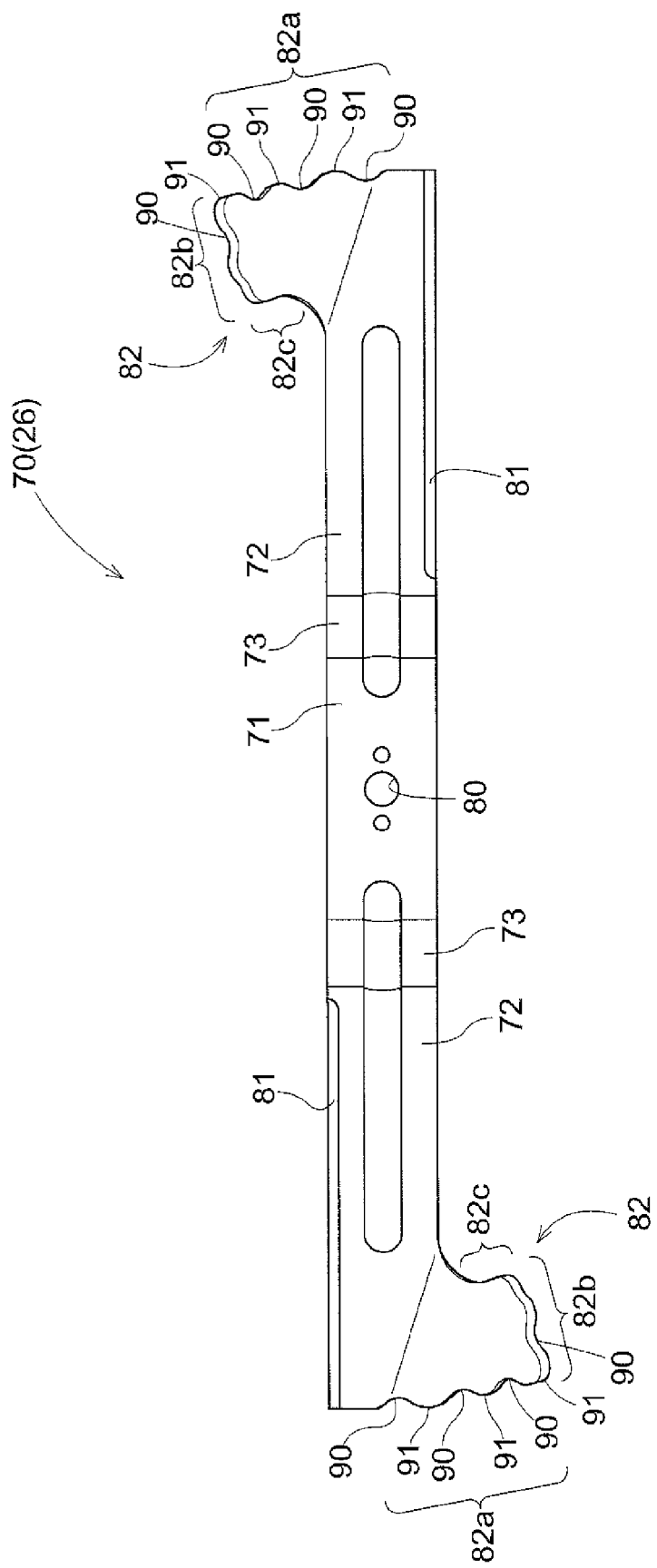
FIG. 4 is a top plan view of the cutter blade.
Figure 5:
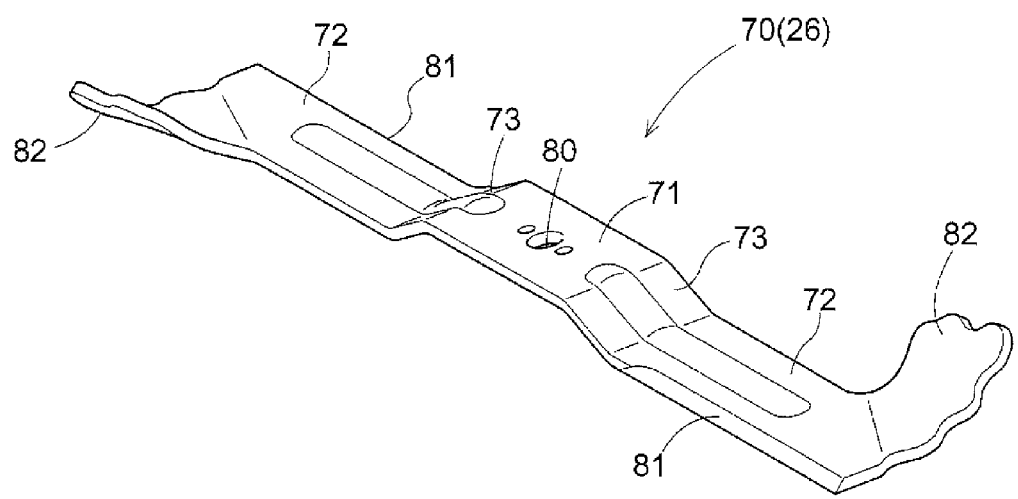
FIG. 5 is a perspective view of the cutter blade.

As shown in FIG. 4 and FIG. 5, the cutter blade 26 is formed by punching e.g. a steel plate. A blade body 70 of the cutter blade 26 includes, along its longitudinal direction, a first portion 71 where a hole portion 80 at which the rotational shaft 8 is mounted is provided, second portions 72 each forming a blade portion 81 and a wind generating portion 82 and third portions 73 between the first portion 71 and the corresponding second portion 72. The height position of the first portion 71 is set higher than the height position of the second portion 72 and the third portion 73 is inclined to extend progressively downwards from the first portion 71 toward the second portion 72.

As shown in FIG. 4 and FIG. 5, at each second portion 72, the blade portion 81 and the wind generating portion 82 are formed. The blade portion 81 and the wind generating portion 82 are formed along a diagonal line in each second portion. With this, the blade portion 81 is disposed on the front side and the wind generating portion 82 is disposed on the rear side relative to the rotational direction.

As shown in FIG. 4 and FIG. 5, a portion of the second portion 71 of the blade body 70 is bent to extend upwards, thus forming the wind generating portion 82. The wind generating portion 82 includes an outer end portion 82a which is the outer end area of the wind generating portion 82 relative to the longitudinal direction of the blade body, an inner end portion 83c which is the inner end area of the same, and an upper end portion 82b joining the upper end of the outer end portion 82a and the upper end of the inner end portion 82c.

Figure 6:
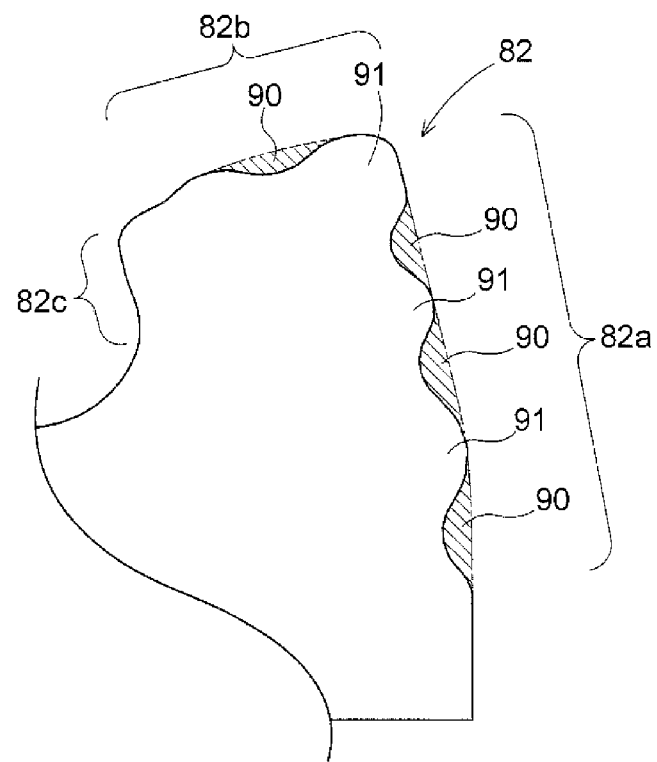
FIG. 6 is an enlarged view showing a wing generating portion.

As shown in FIG. 4 and FIG. 5, at the outer end portion 82a of the wind generating portion 82, there is formed at least one recessed portion 90 which is recessed more inwards than the remaining portion of this outer end portion 82a. In the instant embodiment, three such recessed portions 90 are formed. Further, in this embodiment, at the upper end portion 82b of the wind generating portion 82a, one recessed portion 90 is formed. That is, between and across the outer end portion 82a and the upper end portion 82b of the wind generating portion 82, the recessed portion 90 and a protruding portion 91 located between adjacent recessed portions 90 are disposed in alternation. Namely, this cutter blade 26, as shown in FIG. 6, has a shape formed by cutting away portions corresponding to the recessed portions 90 (shaded portions in the figure) from the wind generating portion 82 of the conventional cutter blade 26. The shape of this recessed portion 90 is not particularly limited, but this is provided by a cutting work for instance. Needless to say, the recessed portions 90 can be formed by any other work than the cutting work. For instance, at the time of punching a steel plate for instance, the recessed portions 90 can be cut away at the same time.

In the instant embodiment, at the boundary area between the outer end portion 82a and the upper end portion 82b, a protruding portion 91 is disposed (that is, no recessed portion 90 is formed here). Further, in the instant embodiment, at the inner end portion 82c of the wind generating portion 82, no recessed portion 90 is formed. In this embodiment, each recessed portion 90 and the protruding portion 91 adjacent thereto are formed continuous with each other along a smooth curved face (a smooth curve line as seen in its front view).

In the instant embodiment, the curvature of the recessed portion 90 is set either substantially equal to or greater than the plate thickness of the steel plate forming the cutter blade 26. Though not particularly limited, in case the plate thickness of the steel plate ranges from 4.5 mm to 6.0 mm approximately, the curvature of the recessed portion 90 can be set to range from 4.5 mm to 12.0 mm approximately, preferably from 6.0 to 12.0 mm approximately, more preferably from 9.0 to 11.0 mm approximately. Further, the curvature of the protruding portion 91 is set either substantially equal to or greater than the plate thickness of the steel plate forming the cutter blade 26. Though not particularly limited, the curvature of the protruding portion 91 can be set to range from 4.5 mm to 12.0 mm approximately, preferably from 6.0 to 12.0 mm approximately, more preferably from 9.0 to 11.0 mm approximately. Incidentally, the curvature of the recessed portion 90 and the curvature of the protruding portion 91 can be made same or different.

When the traveling vehicle body 20 is caused to travel with setting the mower M to the lowered working state, each cutter blade 26 inside the mower housing 21 is driven to rotate about the vertical axis by the cutter blade driving mechanism 22, so that each cutter blade 26 effects a grass mowing or cutting operation. The cut grass is conveyed by a wind generated by the wind generating portion 82 in association with the rotation of the cutter blade 26 and discharged via the cut grass discharge duct 27 disposed at the upper position in the mower housing 21 to the rear upper side of the vehicle body and collected in the grass collector container 32.

In the course of the above, there is generated an air current via the recessed portions 90 from the front side of the wind generating portion 82 (the front side face relative to the rotational direction of the cutter blade 26) to the back side face of the same (the rear side face relative to the rotational direction of the cutter blade 26). Thus, generation of a negative pressure on the back side of the wind generating portion 82 is avoided. Therefore, at the time of rotation of the cutter blade 26, generation of noise due to disturbance of air current on the back side of the wind generating portion 82 can be prevented effectively.

Further, since the recessed portions 90 are open to the outer end side of the wind generating portion 82, clogging of cut grass will occur less likely than the conventional arrangement of providing a hole portion in the wind generating portion 82. Therefore, even when a grass mowing operation is effected continuously, an amount of air can be supplied to the back side of the wind generating portion 82, so that generation of noise can be prevented continuously. In particular, as the recessed portions 90 are formed on the outer end side of the wind generating portion 82, these recessed portions 90 are formed at the outer circumferential edge of the cutter blade 26 where the circumferential speed is highest and negative pressure tends to occur most likely. For this reason, air can be supplied to the negative pressure portion in an effective manner.

Further, as the recessed portion 90 has the shape of being opened on the outer end side of the wind generating portion 82, compared with the case of forming a hole portion in this wind generating portion 82, the possibility of the wind generating portion 82 being damaged at the time of its formation is lower. Therefore, the recessed portions 90 can be formed easily. Incidentally, as described above, although it is preferred that the recessed portions 90 and the protruding portions 91 have curved shapes, the invention is not limited thereto, and these portions have other shapes such as a rectangular shape, etc.

Figure 7:
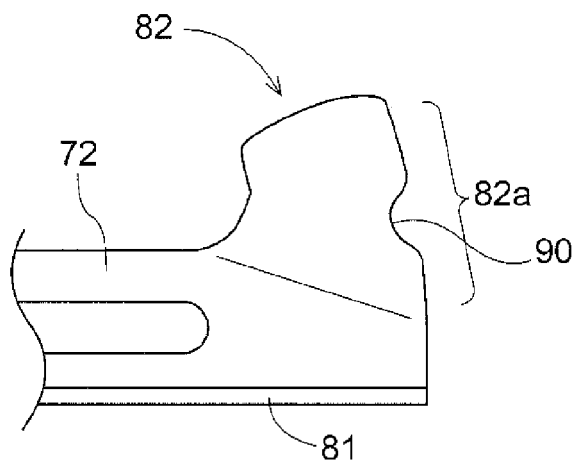
FIG. 7 is a view showing a cutter blade according to a further embodiment.

(1) In the foregoing embodiment, there was explained the example in which three recessed portions 90 are provided in the outer end portion 82a. However, it will suffice if at least one recessed portion 90 is provided in the outer end portion 82a. That is, as shown in FIG. 7, the arrangement can be such that one recessed portion 90 is provided in the outer end portion 82a. Further, it is also possible to provide two or four or more recessed portions 90 in the outer end portion 82b. Further, the recessed portion 90 in the outer end portion 82b is not essential and can be omitted. Further, the recessed portion 90 can be formed in the inner end portion 82c.

Figure 8:
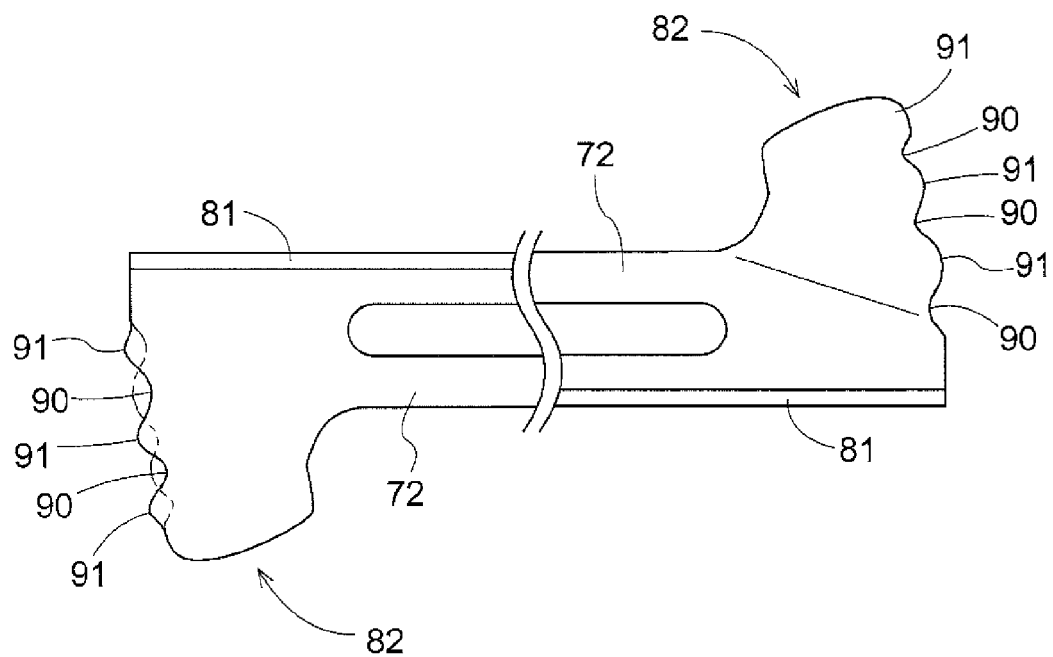
FIG. 8 is a view showing a cutter blade according to a further embodiment.

(2) In the foregoing embodiment, there was explained the example in which the recessed portions 90 are provided at same height positions of the pair of wind generating portions 82. Instead, as shown in FIG. 8, for instance, the height positions forming the recessed portions 90 in the pair of wind generating portions 82 can be made different from each other. In the case of the example shown in FIG. 8, at the height position where the recessed portion 90 is formed in one wind generating portion 82, the protruding portion 91 is formed in the other wind generating portion 82. With making the height positions forming the recessed portions 90 different from each other, even if an amount cut grass is accumulated at the position corresponding to the recessed portion 90 in one wind generating portion 82, this accumulated cut grass can be removed by the protruding portion 91 of the other wind generating portion 82.

(3) In the foregoing embodiment, there was explained an example of the mower M of rear discharge type having two cutter blades 26. However, the present invention is not limited to this foregoing embodiment. The invention may be applied to other types of mowers M than the above, such as a mower M having three cutter blades 26, a mower M having one cutter blade 26, etc. Further, the invention may be applied not only to such rear discharge type mower, but also to a side discharge type mower M, a mulching type mower M, or any other mower than the one described above.

(4) In the foregoing embodiment, the invention was explained by way of the example of the mid-mount type riding mower. However, the invention is not limited to this foregoing embodiment. The invention may be applied also to other types of mowers such as front mount type riding mower, etc.

The invention claimed is:

1. A cutter blade for a mower which is driven to rotate about a vertical axis inside a housing, the cutter blade comprising:
    a blade body;
    a blade portion formed in the blade body; and
    a wind generating portion formed in the blade body on its side opposite in a width direction thereof to the side where the blade portion is formed, the wind generating portion being formed by being raised and bent from the blade body over a predetermined area from an end in a longitudinal direction thereof;
    wherein a plurality of recessed portions are formed at an outer end portion of the wind generating portion in the longitudinal direction of the blade body, each of the recessed portions being recessed more inwards than the remainder of the outer end portion;
    wherein the recessed portions and protruding portions constituting areas between adjacent recessed portions are continuous with each other via a smooth curved line in form of an arc; and
    wherein a curvature of the recessed portions is set greater than a plate thickness of a plate member forming the cutter blade.

2. A cutter blade for a mower according to claim 1, wherein the recessed portions are formed at a portion of the outer end portion excluding a boundary area between an upper end portion of the wind generating portion and an upper end of the outer end portion of the wind generating portion.

3. A cutter blade for a mower according to claim 1, wherein the recessed portions are not formed at a boundary area between an upper end of the outer end portion of the wind generating portion and an upper end portion of the wind generating portion.

4. A cutter blade for a mower according to claim 1, wherein one of the recessed portions is formed at a position in the outer end portion corresponding to a boundary portion between the blade body and a raised portion of the wind generating portion.

5. A cutter blade for a mower according to claim 1, wherein at an upper end portion of the wind generating portion, there is formed at least one recessed portion which is recessed more downward than the remaining portion of the upper end portion.

6. A cutter blade for a mower according to claim 1, wherein a distance between an adjacent pair of the protruding portions across the recessed portion associated therewith is greater than a depth of the recessed portion.

7. A cutter blade for a mower according to claim 1, wherein one of the recessed portions is formed between and across the wind generating portion and the blade body.

8. A cutter blade for a mower which is driven to rotate about a vertical axis inside a housing, the cutter blade comprising:
    a blade body;
    a blade portion formed in the blade body; and
    a wind generating portion formed in the blade body on its side opposite in a width direction thereof to the side where the blade portion is formed, the wind generating portion being formed by being raised and bent from the blade body over a predetermined area from an end in a longitudinal direction thereof, a raised portion of the wind generating portion defining a boundary between the wind generating portion and a remaining portion of the blade body, the boundary extending with an inclination angle toward a rotation advance direction of the cutter blade relative to a longitudinal direction of the blade body;
    wherein a plurality of recessed portions are formed at an outer end portion of the wind generating portion in the longitudinal direction of the blade body, each of the recessed portions being recessed more inwards than the remainder of the outer end portion;
    wherein the recessed portions and protruding portions constituting areas between adjacent recessed portions are continuous with each other via a curved line in form of an arc; and
    one of the recessed portions is formed at a position on the boundary between the wind generating portion and the remaining portion of the blade body.

9. A cutter blade for a mower which is driven to rotate about a vertical axis inside a housing, the cutter blade comprising:
    a blade body, the blade body having a first longitudinal outer end, and a second longitudinal outer end opposite from the first longitudinal outer end in a longitudinal direction of the blade body;
    a first blade portion formed in the blade body associated with the first longitudinal outer end;
    a second blade portion formed in the blade body associated with the second longitudinal outer end;
    a first wind generating portion formed in the blade body on a side opposite from the first blade portion in a width direction of the blade body, the first wind generating portion being formed by being raised and bent from the blade body over a predetermined area from the first longitudinal outer end, a raised portion of the first wind generating portion defining a first boundary between the first wind generating portion and a remaining portion of the blade body, the first boundary extending with an inclination angle toward a rotation advance direction of the cutter blade relative to a longitudinal direction of the blade body; and
    a second wind generating portion formed in the blade body on a side opposite from the second blade portion in the width direction, the second wind generating portion being formed by being raised and bent from the blade body over a predetermined area from the second longitudinal outer end, a raised portion of the second wind generating portion defining a second boundary between the second wind generating portion and a remaining portion of the blade body, the second boundary extending with an inclination angle toward a rotation advance direction of the cutter blade relative to a longitudinal direction of the blade body;

wherein the first wind generating portion has a plurality of first recessed portions formed at the first longitudinal outer end, and a plurality of first protruding portions formed between adjacent first recessed portions, the first recessed portions and the first protruding portions extending continuous with each other via a smooth curved line in form of an arc, and one of the first recessed portions is formed at a position on the first boundary; and wherein the second wind generating portion has a plurality of second recessed portions formed at the second longitudinal outer end, and a plurality of second protruding portions formed between adjacent second recessed portions, the second recessed portions and the second protruding portions extending continuous with each other via a smooth curved line in form of an arc, and one of the second recessed portions is formed at a position on the second boundary.

* * * * *